April 23, 1946.　　　C. B. FISHER　　　2,398,823

ERASING MACHINE

Filed May 15, 1944

INVENTOR.
CHARLES B. FISHER
BY
Richard C. Lindberg.
ATTY.

Patented Apr. 23, 1946

2,398,823

UNITED STATES PATENT OFFICE 2,398,823

ERASING MACHINE

Charles B. Fisher, Glen Ellyn, Ill.

Application May 15, 1944, Serial No. 535,583

19 Claims. (Cl. 120—36)

This invention relates to new and useful improvements in erasing devices, and particularly to a power driven eraser.

The usual type of erasing machine found in the larger drafting rooms and offices generally consists of a small universal type electric motor having mounted on a shaft extension thereof a small cylindrical erasing tip held conveniently in a simple chuck or by some other means. In operation, the motor is energized and the rubber tip is held lightly against the surface to be erased. Holding the tip lightly against the surface to be erased is a procedure requiring considerable dexterity and is often tedious, with the resultant temptation on the part of the operator to bear heavily against the surface to hasten the process and to simplify the task. These practices of the operator tend to place an undue amount of wear on the surface to be erased, and on expensive tracings tend to cause burns with consequent discoloration of the tracing.

Another disadvantage of the machines of the prior art has been the necessity for frequently changing the erasing tip as wear takes place. The loss of time and the trouble involved in supplying new erasing tips for the machine are obvious drawbacks attendant upon devices of the prior art.

Another disadvantage of the devices of the prior art has been that the erased material tends to obscure the material to be erased, and the operator is therefore required to remove the erased material in order to see how the operation is progressing.

The invention here accordingly makes use of an eraser in the shape of a cylindrical tube formed of rubber or other erasing material which is held in a hollow shaft or by other means in a power driven device, in such a fashion that a considerable length of erasing material may be used before a new eraser is required. A feature of the invention includes an arrangement whereby the end of the hollow erasing tube may be stretched radially and held in the hollow shaft to the end that a high peripheral speed of the tip is attained whereby the erased material is easily removed from proximity to the work by virtue of the turbulence in the air therearound. Other salient features are set out below as objects of the invention.

It is an object of the invention to provide an improved erasing member for an erasing machine which can be conveniently and easily held within the shaft of said machine, yet permitting quick and easy adjustment, so that the erasing member can be used with a maximum of efficiency.

A further object of the invention is to provide an erasing machine with a hollow shaft portion adapted to retain and secure a hollow erasing member, said shaft being flared at its end, said erasing member being stretched radially in conformity with said flared end, and extending beyond the end of said flared shaft portion, whereby a high peripheral speed of the erasing machine is achieved, to the end that the erasing may be done more quickly and with less heating of eraser and work.

A still further object is to provide a hollow cylindrical erasing member having a plurality of longitudinal slits therein to the end, that in the erasing machine described in the foregoing object, that the tip of the erasing member forms a plurality of radially extending small erasing projections for creating impact against the surface to be erased, high peripheral speed, and disturbance of the air therearound, whereby the speed of the erasure is increased and erased material is rapidly removed with less heating and consequent wear of the eraser and damage to the work.

A yet further object of the invention is to provide a simple and efficient arrangement for projecting the worn erasing member beyond the end of the member wherein it is retained, so that the machine may be adjusted with a minimum of delay and inconvenience to the operator.

Another object of the invention is to provide in an erasing machine an arrangement for securing an erasing member therein at the same time causing turbulence to the air surrounding the erasing tip during operation so that the erased material is removed readily from proximity to the work in order that the work to be done is not obscured from the operator.

Other desirable objects of the invention will be readily understood from a study of the description hereinafter; however, the invention is described in terms of preferred embodiments thereof and is not to be limited in terms of said embodiments, nor otherwise than by the terms of the claims subjoined.

In the drawing, which illustrates forms which the invention may assume in practice:

Figure 1:
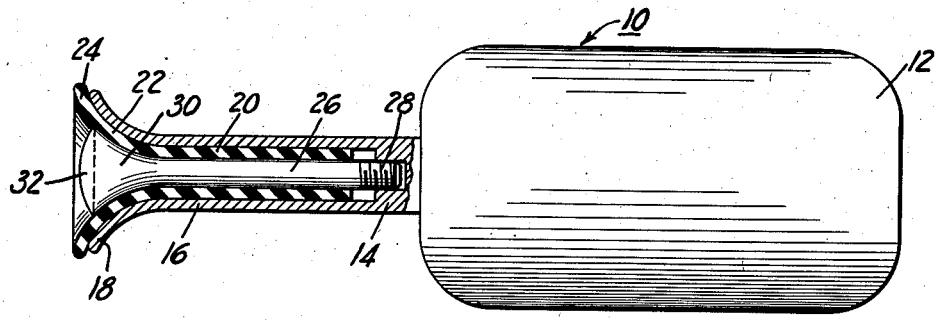
Figure 1 is a part elevation and a part sectional view of an erasing machine according to the present invention.

Referring now to Figure 1, there is shown an erasing machine, indicated generally by the ordinal 10, comprising a motor housing portion 12 having a rotating shaft 14 extending therefrom and including a hollow portion 16 which bells or flares as at 18. The housing portion 12 may enclose any suitable motor device, as for example, a pneumatic, vacuum or electric motor, but for purposes here the motor may be assumed to be of the universal type driven by either alternating or direct current.

Within the hollow shaft portion 16 is retained a hollow cylindrical erasing member 20 which is capable of being stretched as at 22 to fit the contours of flared portion 18 of the hollow shaft 16 and to extend radially therebeyond as at 24 to provide an erasing surface. For maintaining the erasing member 20 in position and in firm engagement with shaft member 16 a tapered spreader bolt 26 is provided, a threaded end 28 of which is held in the shaft 14. For firmly wedging the eraser member 20 against the flared portion 18 of the hollow shaft 16, the bolt 26 has a similarly flared head 30. A slot 32 is provided in the head 30 for engagement by a suitable tool so that the bolt 26 may be threaded into the shaft 14 and the entire assembly held firmly together.

Figure 3:
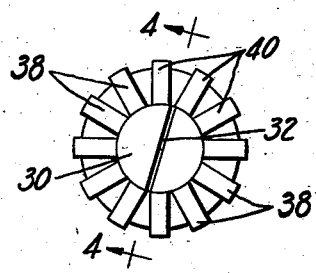
Figure 3 is an end view of an erasing machine as shown in Figure 1, but using as an erasing member the embodiment shown in Figure 2.
Figure 4:
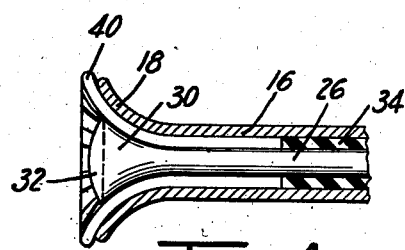
Figure 4 is a section taken on the lines 4—4 of Figure 3.
Figure 2:
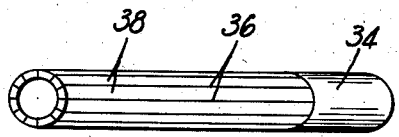
Figure 2 is an isometric view of an erasing member adapted for use in the erasing machine of Figure 1.

Referring now to Figures 2, 3, and 4, another embodiment of an erasing member capable of being employed in the arrangement of Figure 1 is shown. Referring particularly to Figure 2, there is shown an erasing member 34 having a plurality of slits 36 therein to form a plurality of cylinder elements 38. As shown in Figure 4, the hollow eraser member 34 is held in the hollow shaft 16 by means of the tapered spreader bolt 26 and against the flared portion 18 of the hollow shaft 16. As shown in Figure 3, each of the elements 38 extends radially beyond the flared portion 18 to form a plurality of small eraser elements 40.

From the foregoing description it will be apparent by means of the embodiment described in Figure 1 there is provided an erasing device capable of giving high linear or peripheral speeds to the erasing element whereby only very nominal pressures are required against the surface to be erased, at the same time giving enough agitation to the surrounding air to remove erased material and to keep the erased surface cool. In the embodiment shown in Figures 2, 3, and 4, there is provided an erasing device capable of giving high linear or peripheral speeds to the erasing element, at the same time providing a considerable amount of agitation to the surrounding air to remove the erased material and to keep the work cool. By means of the plurality of projecting small erasing elements a certain amount of impact and digging action is given to the surface to be erased, thereby facilitating the erasing.

Figures 5, 6:
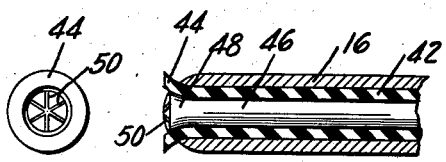
Figure 5 is a sectional view of another embodiment of the invention.
Figure 6 is an end view of Figure 5.

Referring now to Figure 5, there is shown an embodiment of an erasing machine using a tubular erasing member where the end of the member is stretched or flared only slightly, and the retaining screw is provided with a plurality of vanes for creating agitation of the air while the machine is in use, and making possible assembly of the device without the need of a tool. As shown in Figure 5, the hollow shaft 16 carries within it a hollow erasing member 42 which is flared only slightly at its end, as at 44, and secured in the hollow shaft 16 by a retaining screw 46 flared slightly at 48 to distort the erasing member 42. The end of the retaining screw has a series of radial vanes 50 which give agitation to the air surrounding as the eraser member 42 is operated.

Figure 8:
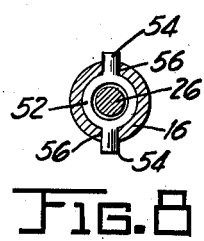
Figure 8 is a view taken in the direction of the arrows 8—8 of Figure 7.
Figure 7:
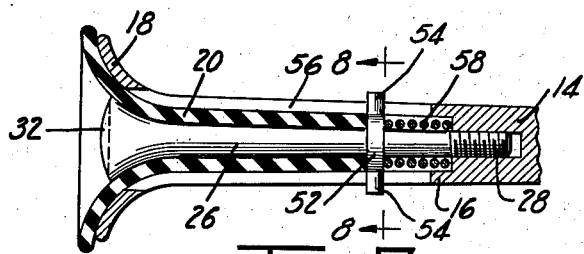
Figure 7 is a sectional view of an erasing machine showing a simple and efficient means for moving the erasing member into working position as wear takes place.

Referring now to Figures 7 and 8, there is shown an embodiment of the invention here where there are provided simple and efficient means for moving the erasing member to the end of the retaining shaft as wear of the member takes place. As shown in Figures 7 and 8, there is provided the shaft 14 having a hollow portion 16 which flares out at 18. The hollow erasing member 20 is held in the hollow shaft and the tapered spreader bolt 26 holds the eraser in position in the hollow shaft 16 and against the flared portion 18, being threadably engaged with the shaft 14 as at 28.

For facilitating the adjustment of the erasing member 20 as wear takes place a collar 52 surrounding the spreader bolt 26 and having a plurality of radially extending ears 54 is provided. The ears 54 extend through a slot 56 in hollow shaft 16 as shown more clearly in Figure 8. The collar 52 may be lightly biased against the inner end of the erasing member 20 by means of a light coiled spring 58 abutting the solid shaft 14 and surrounding the spreader bolt 26.

As wear of the erasing member 20 takes place and it is desired to move the member 20 outwardly and radially, the tapered spreader bolt is first loosened, the collar 52 is moved outwardly at the ears 54 by the operator, and the spreader bolt drawn up once more with a new portion of the erasing member 20 presented for use.

While the invention has been described in terms of preferred embodiments, it is not intended to be limited in terms of the embodiments shown, nor otherwise than by the scope of the claims appended.

I claim:

1. An erasing machine comprising a shaft, a tubular erasing member held thereon, and means passing through said tubular erasing member for securing said erasing member to said shaft.

2. An erasing machine comprising a shaft, means comprising a tube for forming an erasing member, and means passing through said first means for securing said first means to said shaft.

3. A motor driven eraser including in combination: a hollow rotatable shaft, a flared portion on the end of said shaft, and a tubular erasing member held against said hollow rotatable shaft and said flared portion.

4. An erasing machine comprising a motor, a shaft driven by said motor, a tubular erasing member held within said shaft, and a flared member passing through the tubular erasing member to spread the end of the erasing member.

5. A motor driven eraser comprising in combination; a shaft, a flared portion at the end of said shaft, and a tubular erasing member supported by said shaft and bearing against said flared portion.

6. A motor driven eraser comprising in combination: a shaft, a flared portion at the end of said shaft, a tubular eraser supported by said shaft, said eraser being adapted to be deformed to match the contour of said flared portion.

7. An erasing machine comprising a motor, a shaft driven by said motor, a flared portion at the end of said shaft, an eraser being adapted to be deformed radially to match the contour of said flared portion, and means for securing said eraser to said shaft.

8. An erasing machine comprising a motor, a hollow shaft driven thereby, a tubular erasing member supported within said shaft, a member for holding said erasing member within said shaft, and means for moving the erasing member outwardly to adjust for the wear thereof.

9. An erasing machine comprising a motor, a hollow shaft driven by said motor, a tubular erasing member having a plurality of longitudinal slits therein supported within said hollow shaft, and a member for holding said erasing member within said shaft.

10. An erasing machine comprising a motor, a shaft driven by said motor, a tubular erasing member, means for securing the erasing member to said shaft, and means for moving the eraser member outwardly to adjust for the wear of said erasing member.

11. An erasing machine comprising a motor, a shaft driven by said motor, a tubular erasing member, means for securing the erasing member to said shaft and for flaring the end of said erasing member, and means for moving the erasing member outwardly to adjust for the wear thereof.

12. A motor driven eraser including in combination: a hollow rotatable shaft, a flared portion on the end of said shaft, and a tubular erasing member held within said hollow rotatable shaft and said flared portion, said erasing member being adapted to be deformed radially to match the contour of said flared portion.

13. An erasing machine comprising a motor, a hollow rotatable shaft driven by said motor, a flared portion on the end of said shaft, a tubular erasing member supported within said hollow rotatable shaft and said flared portion, said erasing member being adapted to be deformed radially to match the contour of said flared portion, and a member for holding said erasing member firmly against said flared portion and within said hollow shaft.

14. An erasing machine comprising a hollow shaft, a hollow erasing member therein and protruding from the end of said shaft, and means for retaining said erasing member within the shaft, said first means including means for creating turbulence of air around the end of said erasing member.

15. An erasing machine comprising a motor, a hollow rotatable shaft driven by said motor, a flared portion on the end of said shaft, a tubular erasing member having a plurality of longitudinal slits therein supported within said hollow rotatable shaft and said flared portion, and a member for holding the slitted portions of said erasing member against said flared portion.

16. An erasing machine comprising a motor, a hollow rotatable shaft driven by said motor, a flared portion on the end of said shaft, a tubular erasing member having a plurality of longitudinal slits therein supported within said hollow rotatable shaft and said flared portion, and a member for holding the slitted portions of said erasing member against said flared portion, and for holding the erasing member within said hollow shaft.

17. An erasing machine comprising a motor, a hollow shaft driven thereby, a flared portion on the end of said hollow shaft, a tubular erasing member supported within said shaft and said flared portion, said erasing member being adapted to be deformed to match the contour of said flared portion, a member for holding said erasing member against said flared portion, and means for moving the erasing member outwardly to adjust for the wear thereof.

18. A tubular eraser having a plurality of longitudinal slits therein.

19. A tubular eraser having a plurality of substantially longitudinal slits therein.

CHARLES B. FISHER.